Patented Apr. 29, 1941

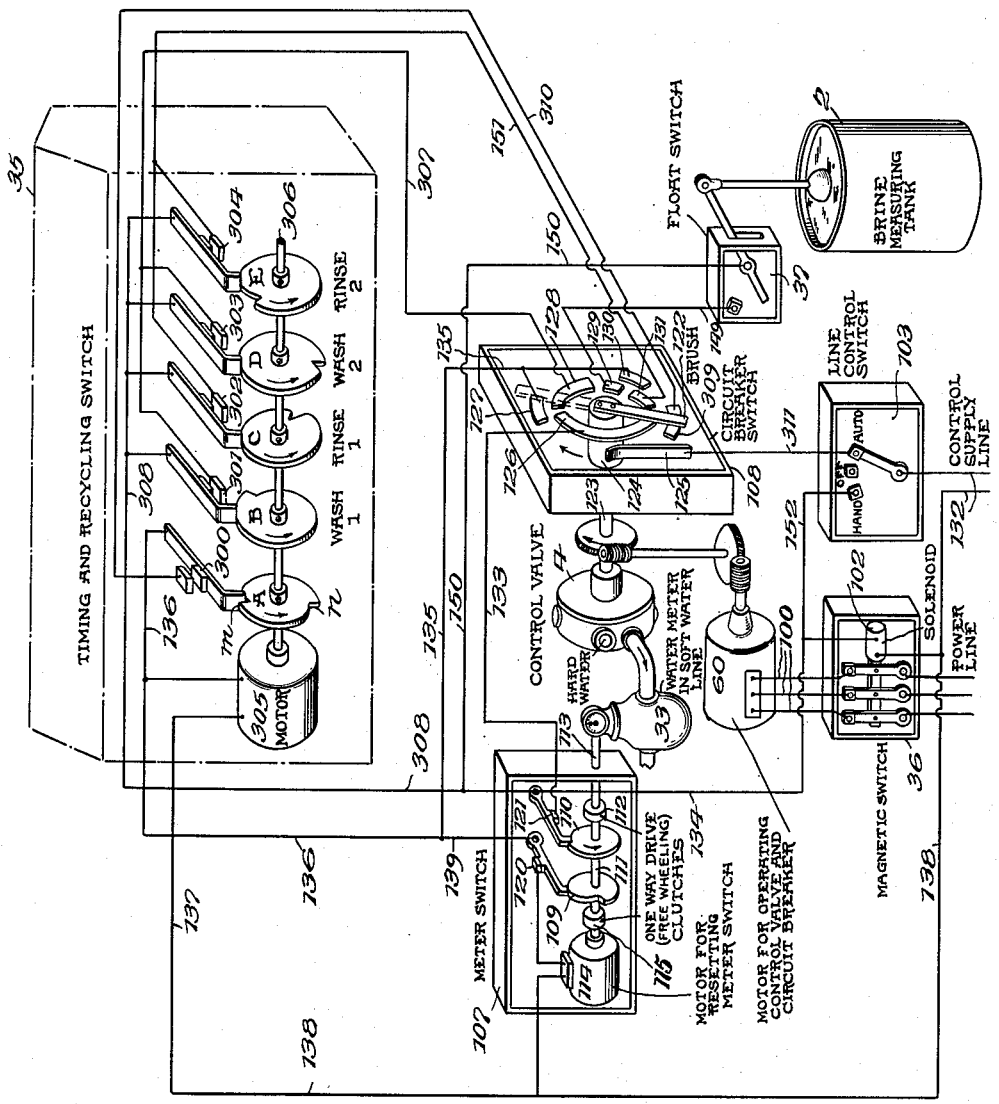

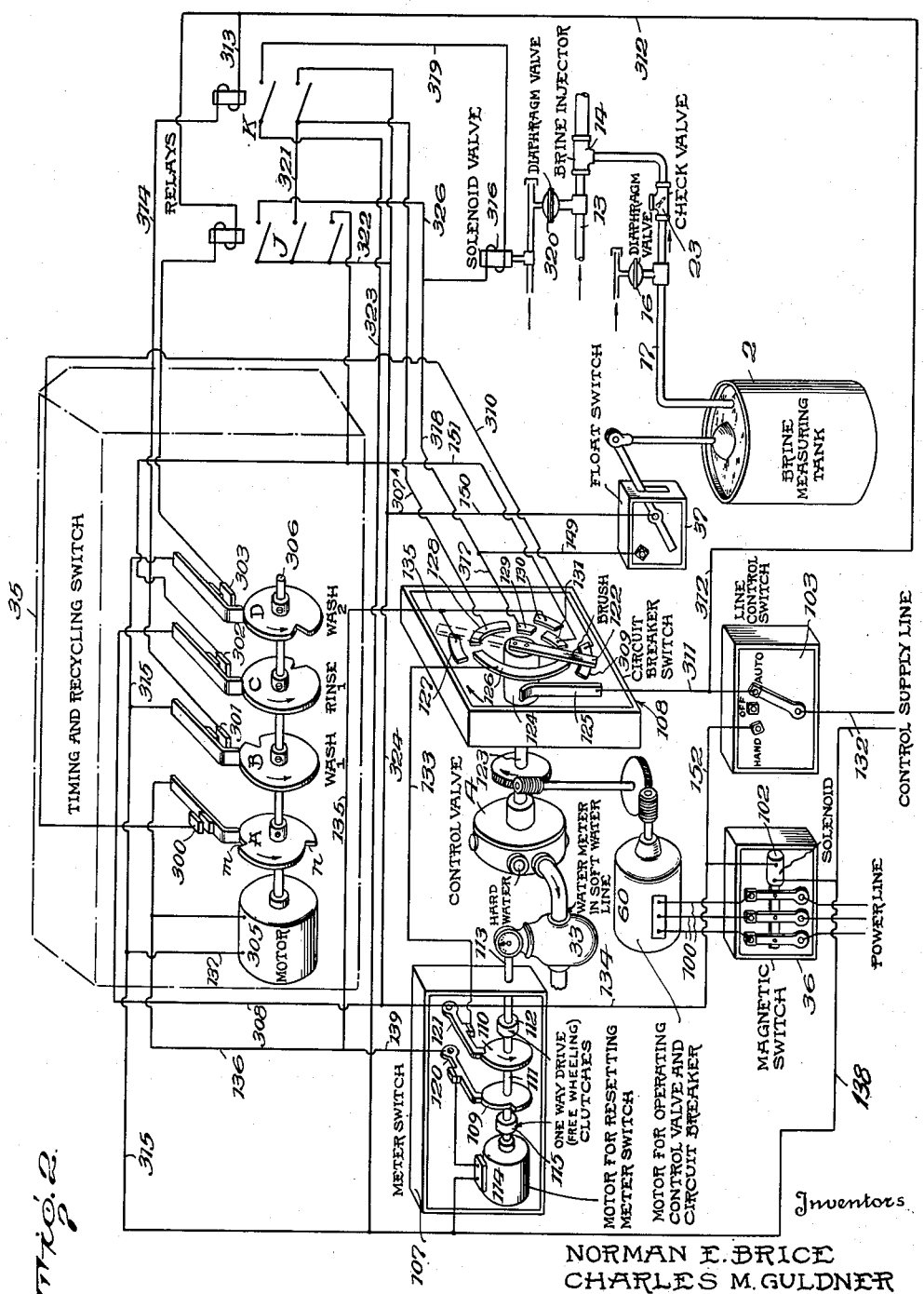

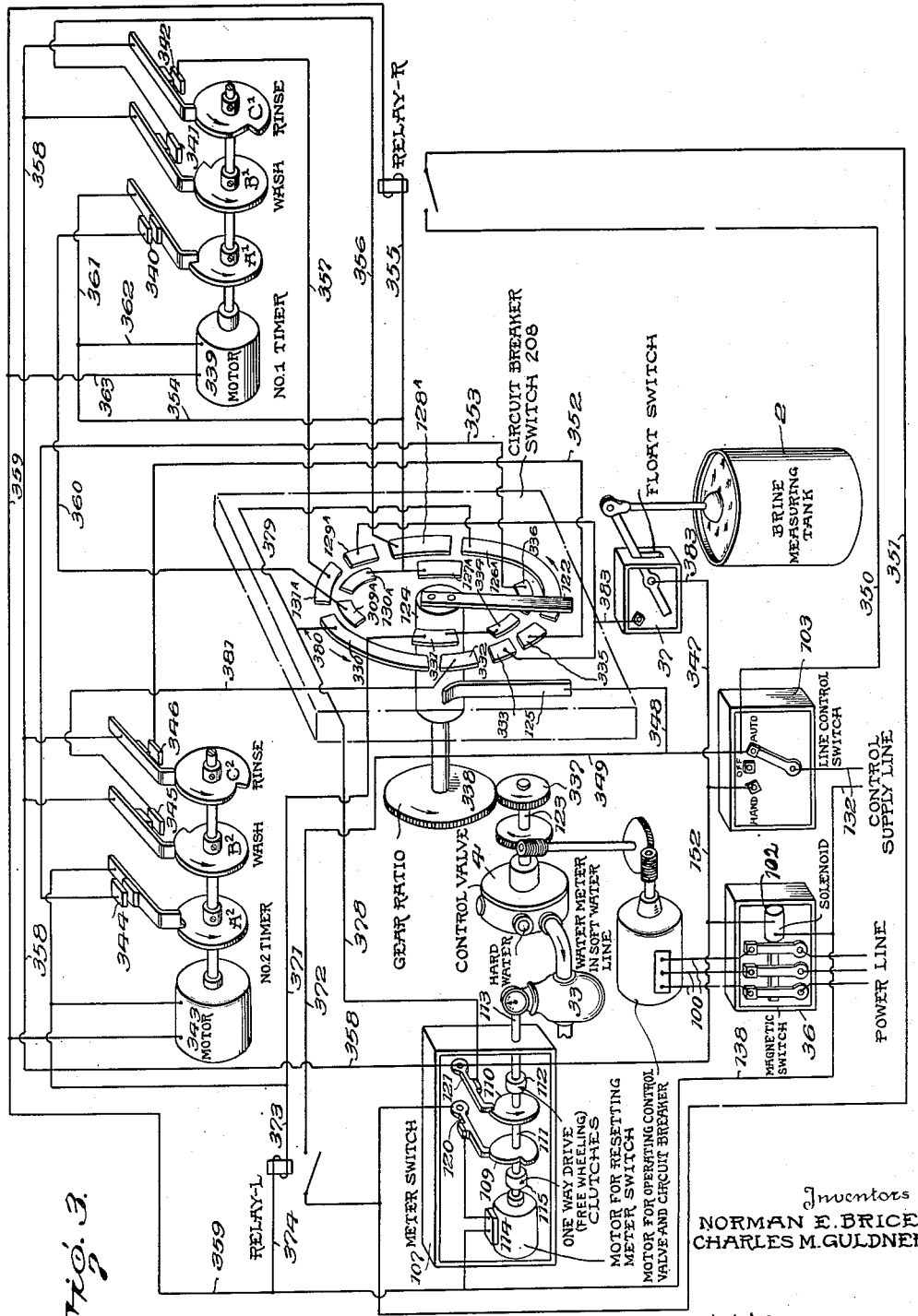

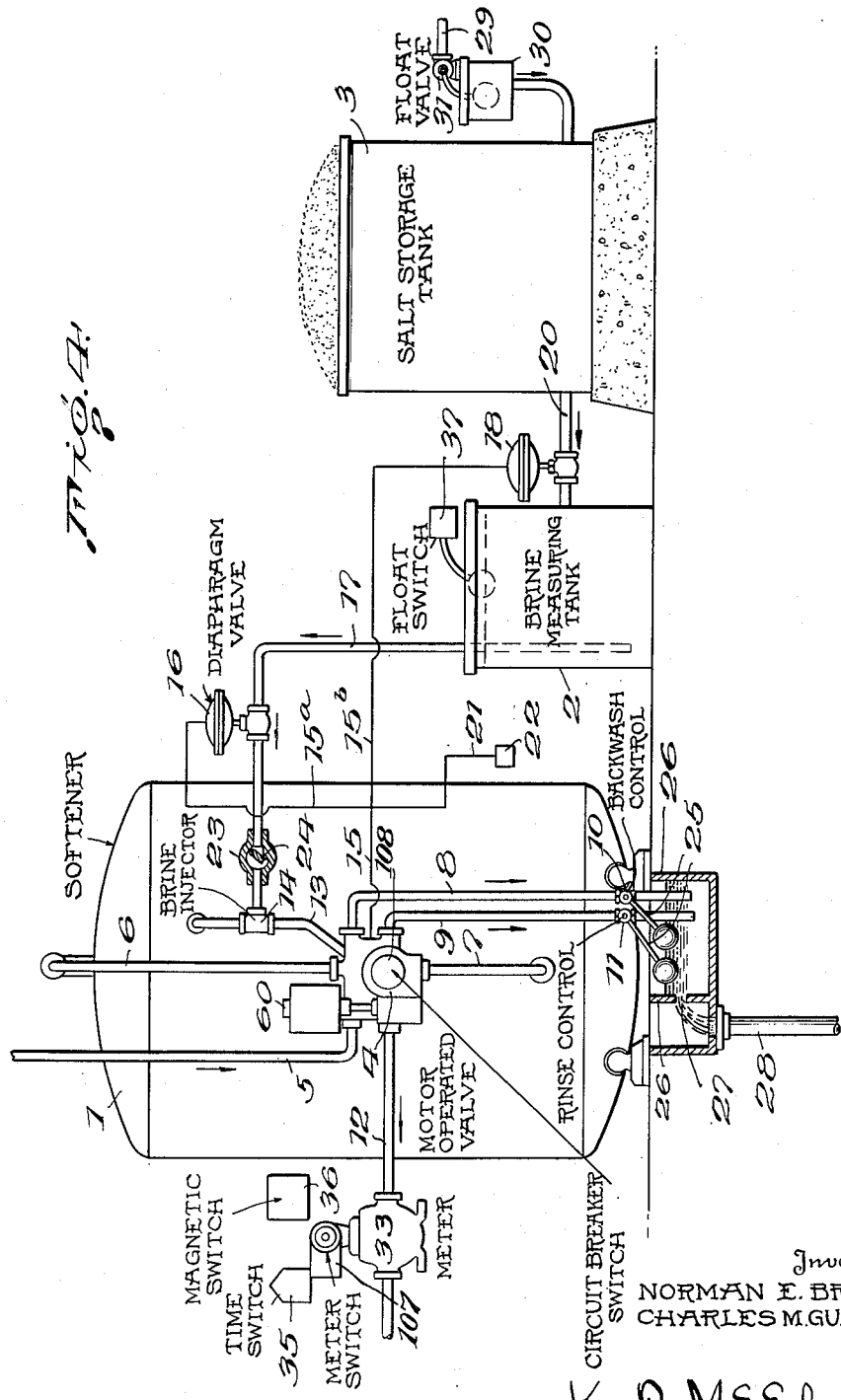

2,240,171

UNITED STATES PATENT OFFICE 2,240,171

AUTOMATIC BACKWASH VARIATION IN WATER SOFTENERS

Norman E. Brice, Millburn, N. J., and Charles M. Guldner, New York, N. Y., assignors to The Permutit Company, New York, N. Y., a corporation of Delaware Application December 1, 1936, Serial No. 113,692

11 Claims. (Cl. 210—24)

This invention relates to automatic backwash variation in water softeners; and it comprises an electrical control system for a downflow zeolite water softener providing automatic intermittent omission or shortening of the backwashing step or automatic additional backwashing when desired, said control system comprising rotary valve means controlling the steps of backwashing, brining and rinsing with return to softening, an electric motor operating the valve means, an electromagnetic switch for the motor, a circuit breaker in circuit therewith and operated by the motor and also in the circuit rotary timing switch means comprising a plurality of cam actuated contacts under timing motor control and coacting with the circuit breaker in control of the valve operating motor to carry out in turn complete cycles of normal regenerating steps and incomplete cycles with interruption of some of said steps to provide variation of alternating backwash steps or additional backwashing steps between normal regenerating cycles; all as more fully hereinafter set forth and as claimed.

In water softening by the zeolite method, particularly when the flow of water through the zeolite bed is in a downward direction, it is necessary occasionally to backwash the bed by a brisk upward flow of water in order to remove slime and dirt which has been filtered from the water and deposited in the top of the zeolite bed during the softening run. The backwash flow also has the advantageous effect of loosening the bed and reclassifying the zeolite granules as to size. The usual practice is to make backwashing the first step in the regeneration or reconditioning of the bed when its base exchanging water softening capacity approaches exhaustion. But it is not always necessary to backwash in every regeneration. If the water is clear only a small amount of dirt is accumulated during the softening run and if the water is extremely hard the softening runs are relatively short and but little dirt is deposited during the run. In many cases the softener requires backwashing only once in two or more regenerations.

In manual operation of water softeners, it is a simple matter to backwash only when necessary, that is, to put off backwashing until it is needed. Backwashing may be skipped in the regeneration, or, should the water be muddy, extra backwashings between regenerations can be inserted. In any case backwashing may be made to fit particular conditions as they occur from time to time. Variation of the frequency and duration of backwashing or of the amount of water used in backwashing, presents no problem in manual operation. Backwashing of course requires large amounts of water and considerable time and attention of the operator.

In automatic water softeners, backwashing occurs as part of the regeneration cycle at fixed times and for fixed predetermined periods. It is usually regulated by metering devices according to the quantity or flow of water directed upwardly through the zeolite bed or by clock controlled devices determining the duration of the backwash flow. Naturally variation of the number of backwashings or of the period of backwashing is not readily possible in an automatic apparatus.

In the present invention we provide automatic control of backwashing so that it can be varied both as to the number of backwashings for each regeneration and as to the quantity of water used or the duration of flow during backwashing. To meet various conditions in different water supplies, backwashing is intermittently omitted or shortened as one of the steps in regeneration or extra backwashings between regeneration cycles are provided as desired. In automatic water softeners regenerated at intervals determined by the quantity of water softened or by the condition of the softened water effluent, backwashing can be automatically omitted on one or more successive regenerations according to a preselected program or extra backwashing steps may be inserted between regenerations, as the case may be. In addition, the invention permits variation of backwashing to meet changing conditions in a particular water supply. By use of this automatic backwash control system under conditions to which it is applicable an appreciable lessening of waste water requirements is possible. In special instances, where water is scarce or obtained at high cost, saving in the quantity of waste water is of primary importance. Generally the indirect saving in salt required for regenerating is of greater importance. This saving of salt results from the reduction in the quantity of waste water which is softened as it passes through the zeolite bed. Exchange capacity of the bed used up in softening excess wash water requires an extra quantity of salt and we are able to minimize this extra salt consumption.

We accomplish backwash variation in automatic softeners by providing alternate cycles of regeneration including the normal steps of backwashing, brining and rinsing followed by incomplete regeneration cycles in which one or more of the normal steps may be wholly or partly eliminated. When backwashing is to be shortened or omitted, a timing device is provided which interrupts backwashing or cuts off a portion or substantially all of the backwashing step in every other regenerating cycle, or in one or two out of every three cycles. When extra backwashing is to be provided normal cycles of the three steps of backwashing, brining and rinsing are followed by cycles in which the brining and rinsing steps are eliminated and the cycle embraces backwashing only.

The timing device providing in turn normal cycles of regeneration followed by incomplete cycles with elimination of steps is electrically operated and advantageously takes the form of a constant speed or synchronous motor operating a plurality of switches usually by means of actuating cams, the switches serving to control the starting of a valve operating motor to make the shifts of the softener from backwashing to brining and from rinsing to softening.

The timer controls the duration of the backwashing and rinsing periods in each case. It is possible merely by adjusting the timer to provide—

(a) Normal backwash periods on every regeneration, (b) Normal backwash on one or more out of a number of regenerations and omission of backwash on intervening regenerations, (c) Normal backwash on one or more out of a number of regenerations and very short backwash on intervening regenerations, the latter serving only to loosen the zeolite bed rather than to remove accumulated dirt.

It is also possible to provide additional backwashing by elimination of the brining and rinsing steps from a predetermined number of regenerating cycles.

In the accompanying drawings are shown control systems for automatic water softeners providing means for elimination of steps in alternate regeneration cycles as automatic means for variable backwash control. In this showing, Fig. 1 is a diagrammatic elevational view of an automatic control system providing means for carrying out complete normal cycles of regeneration followed by cycles in which backwashing is eliminated in whole or in part;

Fig. 2 is a diagrammatic elevational view of an automatic control system permitting additional backwashing between normal cycles of regeneration, the additional backwashing being effected by elimination of brining and rinsing from alternate regeneration cycles;

Fig. 3 is a diagrammatic elevational view of a modified automatic control system permitting omission of backwashing on alternate regeneration cycles or short backwash in one cycle followed by full backwash in a succeeding cycle of regeneration; and Fig. 4 is a diagrammatic elevational view with parts in section of an automatic water softener complete with automatic brine supply means.

Referring to Figs. 1 and 4, the automatic control system comprises a control valve 4 for making the necessary pipe connections in carrying out regenerating cycles in a water softener, an electric motor 60 operating the control valve through speed reducing gearing, a circuit breaker switch 108 arranged upon the valve operating shaft 123 for operation by the valve motor, a magnetic switch 36 having a solenoid 102 in electric circuit with the circuit breaker switch 108, a brine control float switch 37 also in the control circuit and timing switch means 35 operated by synchronous motor 305 with a shaft 306 upon which are mounted switch cams actuating switches in circuit with the circuit breaker switch 108 and the solenoid 102 of the magnetic switch.

In this control system, as shown, the regenerating cycle is initiated by a water meter 33 actuating a meter switch 107 connected in the control circuit, as shown in Figs. 1, 2 and 3; backwashing is made the first step in the regenerating cycle and is followed in order by brining, rinsing and return to softening. The duration of backwashing is timed by means of the timing motor 305 operating a cam actuated contact energizing the control circuit and solenoid 102 to supply the motor 60 with current through switch 36 and wires 100 for setting the valve control means to shift from backwashing to brining. The shift from brining to rinsing by the control valve means is effected by the closing of float switch 37 energizing the control circuit for motor 60 in response to passage of a predetermined quantity of brine from brine measuring tank 2 into the softener. The rinsing flow is timed by motor 305 operating a second cam actuated contact to close a switch energizing the control valve motor circuit for the return to softening. In all cases, after the control valve is set by motor 60 the motor is stopped by the circuit breaker 108 opening the control circuit to deenergize the solenoid 102 permitting the magnetic switch 36 to open. As shown, the automatic valve control follows the general lines of the Staegemann control means described in U. S. Patent No. 2,051,155.

The backwash control system of the present invention is such that the backwashing, brining and rinsing of the softener are carried out automatically according to one program on every other regenerating cycle and, when desired, according to a different program on intervening cycles.

In varying the program of regeneration in alternating cycles the timing switch means 35 cooperates with the circuit breaker switch 108. The latter is formed with segments or arcuate strips 126, 127, 128, 129, 130, 131 and 309 in angular positions corresponding to the several control valve positions taken by the valve in effecting the various steps of regeneration. Contact is made with the various arcuate contact strips by a brush 122 on shaft 123 and connected with the sleeve 124 made of conducting material with which a contact spring 125 engages to connect the circuit breaker through wire 311 in circuit with the control supply line 132, this line, as shown, being provided with a manually operated control switch 103. Each of the several contact strips 126, 128, 129 and 131 on circuit breaker 108 associated with the various positions of the control valve 4 has a wire connection leading through another switch, to be described hereinafter, to solenoid 102, each of said other switches being adapted to complete a circuit through this solenoid back to the line 132. Switch 36 is normally held in open position by means of a spring (not shown) and is moved to closed position (illustrated in Fig. 1) by energization of the solenoid 102. As the brush 122 is moved from each of the contact strips 126, 128, 129 and 131 to the next succeeding strip which is then in series with another open switch the circuit through solenoid 102 is broken and the valve motor 60 stops, leaving the control valve in a position corresponding to the angular position of the circuit breaker strip upon which brush 122 comes to rest when the motor stops.

Circuit breaker strips 127, 128, 130, 131 and 309 have wire connections to the timer switch 35, which is a motor driven cam switch consisting of the motor 305, a suitable gear train (not shown) operating shaft 306 and a set of cams A, B, C, D and E, with follower spring contacts 300, 301, 302, 303, 304, respectively operated by the cams. Cam A is a cycle stop cam provided with two notches $m$ and $n$. Cam shaft 306 rotates 180 degrees during a first regeneration cycle, from a position at which the follower contact 300 rests in notch $m$ to another position at which the follower rests in notch $n$. Similarly, the shaft 306 rotates the remaining 180 degrees during the next regeneration to move notch $m$ around to the follower, contact 300 being broken when the follower engages each notch. Engagement of the cam followers with the single notches in cams B, C, D and E closes contacts 301, 302, 303, 304, respectively. By adjustment of cams B and C to close the contacts 301, 302 during the first 180 degrees rotation of shaft 306 and cams D and E to close their contacts 303 and 304 during the following 180 degrees rotation of the shaft, it is possible to set up two different programs for reconditioning the softener. These programs will occur alternately with cams B and C controlling the wash and rinse periods, respectively, for one program, and cams D and E similarly controlling the wash and rinse periods for the other program. Thus the timer serves for recycling as well as for timing.

The meter switch 107 has a shaft 111 to which cams 109 and 110 are attached. Shaft 111 is arranged for rotation, always in the same direction indicated by an arrow on cam 110, either by the meter 33 through shaft 113 and one way drive clutch 112 (one way drive clutch 115 then permits the shaft of motor 114 to remain at rest), or by the motor 114 through one way drive clutch 115 (one way drive clutch 112 then permitting the shaft 113 to remain at rest). A notch on cam 110 is adapted to close a normally open switch 121, and a notch on cam 109 is adapted to open a normally closed switch 120. At the beginning of the softening step switch 120 is opened by the notch on cam 109, and at the same time switch 121 is held open by cam 110. As softening progresses and the cams 109 and 110 are slowly rotated by the meter 35, switch 120 is soon moved to closed position by cam 109, and finally, at the end of the softening step, switch 121 is closed by the notch on cam 110 (the position shown in Fig. 1). The duration of the softening step is thus determined by the angular relationship of the notches on cams 109 and 110, and in order to permit adjustment of the quantity of water passing through meter 33 in the softening step, cam 110 is made angularly adjustable on shaft 111. The meter switch 107, shown diagrammatically in the drawings, is preferably constructed as disclosed in detail in U. S. Patent 1,914,333 to Staegemann, dated June 13, 1933. Switch 120 is connected, through motor 114 and wire 138, with supply line 132, and, through wires 139 and 135 with the circuit breaker strips 127 and 130. Switch 121 is connected through wire 134 with solenoid 102, and through wire 133, with the circuit breaker strip 126.

The operation of timing and recycling from the softening position of all elements as shown in Fig. 1 is as follows:

After the softener has delivered a quantity of water corresponding to the setting of cam 110 of the meter switch 107, rotation of cam 110 by the meter 33 through shaft 113 and one way drive clutch 112 closes contact 121 on the meter switch. This closes a circuit from the control supply line 132 through switch 103, wire 311, brush 125, sleeve 124, brush 122, the circuit breaker strip 126, wire 133, meter switch contact 121, wire 134 and solenoid 102 which is connected with the supply line 132 through wire 138. This closes the magnetic switch 36 energizing the valve motor 60, turning the control valve 4 to establish the backwash connections. When the valve reaches this position, the circuit is broken by the passage of brush 122 from circuit breaker strip 126 to make contact with strips 127 and 128. The breaking of this circuit de-energizes solenoid 102 which opens switch 36, stopping motor 60.

Contact of brush 122 with strips 127 and 128 establishes a circuit through circuit breaker strip 127 and wires 135 and 136 to timer motor 305 and through wires 137 and 138 leading to supply line 132. Motor 305 slowly rotates cam shaft 306, soon closing contact 300 as the follower leaves notch $m$ of cam A. At the same time a circuit is closed through resetting motor 114 of meter switch 107 by wires 135 and 139 running from strip 127 of the circuit breaker to switch 120 and thence through motor 114 and wire 138 to supply lines 132. Motor 114 is thus energized to reset the meter switch by means of shaft 111 and one-way, free-wheeling clutch 115. The resetting of cam 109 opens contact 120 and stops the resetting motor. Timer motor 305 continues to rotate until the notch on cam B engages the follower and contact 301 is closed, thus establishing a circuit from strip 128 of the circuit breaker through wire 307, contact 301, wires 308 and 134 through the solenoid 102 of switch 36. This switches on motor 60 which turns the control valve from the "backwash" to the "brine" position. When the valve rotates to the "brine" position, the circuit through coil 102 of the magnetic switch is broken as circuit breaker brush 122 leaves strip 128 and reaches strip 129. In the meantime, the circuit to timer motor 305 has been broken when brush 122 leaves strip 127. The timer does not function during the brining operation.

In the "brine" position of the control valve, brine is drawn from the measuring tank and delivered to the softener, the pipe connections being shown in Fig. 4 and described in detail in the aforesaid Staegemann Patent 2,051,155. When a predetermined desired quantity of brine has been drawn from the measuring tank, float switch 37 is closed, establishing a circuit from strip 129 of the circuit breaker through wires 149 and 150 and wire 134 running to switch coil 102. Switch 36 is closed and the valve motor 60 is energized to turn the control valve to the position for rinsing. The valve is set automatically in the "rinse" position when the circuit to the coil 102 of the magnetic switch is broken as brush 122 leaves strip 129 and contacts strips 130 and 131 of the circuit breaker.

In this "rinse" position of the circuit breaker the timer motor 305 is again started by a circuit established through circuit breaker strip 130 and wires 135 and 136 running to the motor 305 and wires 137 and 138 back to the supply line 132.

The timer operates until the time interval for which cam C is set has elapsed. Then contact 302 closes, establishing a circuit from circuit breaker strip 131 through wire 151, timer contact 302, and wires 308 and 134 to magnetic switch coil 102. The magnetic switch is closed and valve motor 60 is energized to turn the control valve from the "rinse" to the "soften" position where it stops when the coil circuit of the magnetic switch is broken as brush 122 on the circuit breaker leaves strip 131 and passes to strip 126. This completes the full normal regenerating cycle including the backwashing of the softener.

The timer continues to operate after the return to softening because of a circuit established through strip 309 of the circuit breaker running through wire 310 to the cycle stop time contact 300, and thence through wire 136, motor 305 and wires 137 and 138 to control supply line 132; timer contact 300 having been closed shortly after the regenerating cycle was started by meter switch 107. The timer operates until the spring follower on cam A drops into notch n which breaks contact 300 and causes the timer to stop in the position from which it must start on the next cycle of regeneration. In the meantime the contacts 301 and 302 have been opened by cams B and C. The automatic refilling of the brine measuring tank 2 (Fig. 4) opens the float switch 37. The meter switch 107, having been reset during the backwashing period, is ready to start the next cycle of regeneration.

Assuming that it is desired to skip backwashing on every second regeneration, this is accomplished by setting cam D of the timer, which controls the backwashing period on every second regeneration, so that contact 303 will be closed when the cycle stop cam follower making contact 300 drops into notch n at the end of the recycling period.

As the meter switch contact 121 is again closed at the end of the softening run, a circuit is established as in the preceding cycle which starts the motor to turn the control valve to the "wash" position. When the valve rotates to the "wash" position, however, it is not stopped by the passage of brush 122 from strip 126 to strips 127 and 128 of the circuit breaker. Because the magnetic switch 36 is held closed by a circuit established through contact strip 128, wire 307, the now-closed timer contact 303, wires 308 and 134 and coil 102. The valve motor 60 continues to operate and turns the control valve through the "wash" position, stopping in the "brine" position when the magnetic switch coil circuit is broken as brush 122 of the circuit breaker leaves strip 128 and comes to rest on strip 129. The backwashing step is thus eliminated. Brining and rinsing operations take place as in the preceding cycle and the timing of the rinsing period is governed by the setting of cam E on the timer shaft 306. When the control valve returns to the "soften" position, the timer is recycled as before through strip 309 of the circuit breaker and continues to operate until contact 300 is broken by the drop of the cam follower into notch m of cam A. This resets the timer. The arrangement as described provides for substantially complete omission of the backwashing operation in every other regeneration cycle. The apparatus described, however, is not limited to a program of complete omission of backwashing. Should conditions change seasonally or otherwise, making it necessary to backwash in every regenerating cycle, the timer switch can be adjusted for the desired program. For example, if a 10 minute backwash and 20 minute rinse were desired for all regenerations, cam B could be set to close contact 301 after 10 minutes operation of the timer and cam C could be set to close contact 302 after 20 minutes additional operation of the timer. On the second half of the cycle, that is, in the alternate 180° rotation of the cams, similar respective settings can be arranged for cams D and E.

In the event that operating conditions are such that only a very little dirt is filtered from the water, but that the zeolite bed has a tendency to become packed toward the end of each softening run, causing considerable loss of pressure head, it is possible to adjust the foregoing described apparatus so that the full backwashing occurs on every other regeneration and a short backwashing, as of one or two minutes for example, on the intervening cycles. The short backwashing is not sufficient to clear dirt away but serves to loosen the packed bed. For example, if a 10-minute backwashing and 20-minute rinse be desired on every other regeneration cycle, a one-minute backwash and 20-minute rinse on intervening cycles, cam B would be set to close contact 301 after 10 minutes operation of the timer by motor 305 and cam C to close contact 302 in 20 minutes after the shift from "brine" to "rinse"; on the next half revolution of shaft 306, cam D is set to close contact 303 after one minute operation of the timer motor and cam E to close contact 304 after 20 minutes timer operation.

It will be apparent that cams B and D can be replaced by a single cam having two indentations engaging one follower closing one contact at different predetermined times to provide differing backwash periods in succeeding cycles. Similarly, cams C and E can be consolidated into a single cam with one follower for control of the duration of rinsing in succeeding cycles. However, when each different period of backwashing or of rinsing requires variation from time to time to meet changes in operating conditions, the two cams have the advantage of being separately adjustable in position on shaft 306. For such adjustability a single cam made in several pieces carrying the several indentations is less desirable.

The above described control system can be modified to provide short or zero wash periods in two of three succeeding regenerations, two of four regenerations, three of four regenerations, or in fact any combination of regenerating steps that may be desired. The changes required from the system as described in detail consist of provision of an increased number of notches in the cycle stop cam A and an increased number of load cams controlling the wash and rinse during the periods into which the time cycle is divided by cam A.

The entire control system is rendered inoperative by setting the switch 103 in "off" position. Upon movement of the switch to "hand" position a circuit is established through wire 152 and solenoid 102, energizing motor 60 to move valve 4. The valve may thus be moved to any desired position under manual control, the motor being then stopped by returning switch 103 to "off" position.

Control providing for additional backwash between regenerations

There are occasional installations of downflow zeolite water softeners where the water to be softened contains so much suspended matter that the top of the zeolite bed will become covered with material filtered from the water and the loss of pressure head in the unit will become excessive before the end of a normal softening run. Where the expense of filtering the water before passing it to the softener cannot be endured, it is often possible to operate under the foregoing conditions by backwashing the softener between regeneration cycles in addition to the usual backwash immediately preceding brining and rinsing.

The following control system automatically regenerates a downflow zeolite water softener at intervals determined by the quantity of water softened, and provides one or more additional backwashings at regularly spaced intervals between regenerations. The spacing of the additional washings is proportional to the quantity of water delivered by the softener, i. e. for example, if one extra backwashing is provided between regenerations, it occurs when the softener has delivered one half the total quantity of water softened between regenerations. The control is effected by means eliminating the "brine" and "rinse" from alternate reconditioning cycles.

This elimination is shown in Fig. 2 in which the motor operated valve, meter, meter switch, circuit breaker switch, motor starting switch and timer are similar to those used for the previously described system. In addition, relay means is provided to prevent injection of brine when the control valve turns through the cycle in which elimination of brining is to be effected. The control causes the valve to pass through the "brine" and "rinse" positions, without stopping.

The meter switch 107 is geared to the mechanism of the meter 33 so that the contact 121, which starts the control valve on its cycle, closes twice (or more often if desired) during each softening run. Thus the control valve is caused to make two revolutions during each softening run. On the first revolution, the softener may be backwashed and regenerated in the usual manner controlled by the timer, the cam shaft on the latter turning 180° for each closing of the meter switch. On the following closing of the meter switch, the control valve again turns through one revolution, but this time it is so controlled by the timer and the relays that no brine is injected into the softener and the rinsing operation is eliminated. This arrangement thus provides the required additional washing between regenerations.

In detail, the overtaion takes place in the following manner with reference to Fig. 2.

When the meter switch contact 121 is closed by the meter at the end of the softening run a circuit is completed from the control supply line 132 through the "auto" side of the control switch 103, wire 311, contact spring 125 on the circuit breaker, contact sleeve 124, brush 122, contact strip 126, wire 133, contact 121 on meter switch 107, wire 134, coil 102 of the magnetic switch to supply line 132. The magnetic switch closes, energizing the motor 60 to turn the control valve to the "wash" position, where it stops when the control circuit is broken as brush 122 leaves contact 126.

In the "wash" position the timer motor 305 is energized through a circuit established from control supply line 132, through circuit breaker strip 127, wires 135 and 136, timing motor 305 and wires 137, 315 and 138 to supply line 132. The motor 305 drives the timing cam shaft 306 in the direction indicated by the arrow until contact 301 is closed by cam B. This establishes a circuit from control supply line 132, through the control switch 103, wires 312 and 313, coil of relay K, wire 314, contact 301 on timer, wires 315 and 138 to supply line 132. Relay K operates, closing its contacts and thereby establishing a circuit energizing the coil 102 of the magnetic switch from contact strip 128 on the circuit breaker 108 through wires 307A and 324. The magnetic switch closes, energizing the valve motor 60 and causing the control valve to turn to the "brine" position. The timer motor is de-energized during the brining operation as brush 122 leaves contact 127 on the circuit breaker.

The control valve stops in the "brine" position as the circuit to the coil of the magnetic switch is broken when brush 122 on the circuit breaker leaves contact 128. Brush 122 then rests on contact 129 from which solenoid valve 316 is energized through wires 317, 318, coil wire 319, and one contact of relay K (now closed) and wires 323 and 138. The solenoid valve 316 opens, admitting pressure to top of the diaphragm valve 320. The latter also opens admitting pressure water to the hydraulic ejector 14. Diaphragm valve 16 has already been opened by means of a pilot connection (from line 15, Fig. 4) opened as the control valve turns into the "brine" position. The ejector sucks brine from the measuring tank 2 and delivers the mixture of brine and pressure water to the softener. This operation is terminated when the float switch 37 closes, energizing the coil 102 of the magnetic switch from contact 129 of the circuit breaker through wires 149, 150, 324. The magnetic switch closes, energizing the valve motor which turns the control valve to the "rinse" position. Solenoid valve 316 closes when brush 122 leaves contact 129. Closing of the solenoid valve causes the diaphragm valve 320 to close. Diaphragm valve 16 closes as the control valve turns out of the "brine" position. Relay K remains energized until contact 301 is opened. This occurs during the rinsing period.

In the "rinse" position of the circuit breaker 108, the timer motor 305 is again energized, this time from strip 130 of the circuit breaker. The rinsing of the brine from the softener continues for a time determined by the setting of cam C on the timer. Contact 302 then closes, energizing the coil 102 of the magnetic switch through wire 151 from contact strip 131 of the circuit breaker. The magnetic switch closes, starting the valve motor. The control valve turns to the "soften" position where it stops when brush 122 on the circuit breaker leaves strip 131, coming to rest on strips 126 and 309 in the "soften" position.

In the "soften" position, the timer motor is again energized from contact strip 309 on the circuit breaker and through its own cycle stop contact 300. The motor continues to operate until the cam shaft has completed the remainder of a half revolution when the contact spring on cam A drops into notch $n$. This opens contact 300 causing the timer to stop in the position from which it must start on the next half of its cycle.

During the backwashing of the softener the meter switch 107 is reset as previously described.

After the softener has delivered one-half the quantity of water that it is capable of softening between regenerations, the meter contact 121 again closes causing the control valve to turn to the "wash" position as before.

In this "wash" position of the control valve, the timer motor 305 is energized from strip 127 on the circuit breaker. Starting from the position where the contact spring of cam A rested in notch n (to which it was set automatically after the preceding regeneration) the cam shaft is rotated for a period equivalent to the desired duration of the extra washing. Then contact 303 of cam D closes, energizing the coil of relay J.

Relay J is closed and establishes a circuit from control supply 132 through contact strip 128, wires 307A and 321, contacts of relay J, wires 322, 324, 134, coil 102 of magnetic switch 36, to control supply 132. The magnetic switch closes, starting the valve motor 60 and causing the control valve to turn from the "wash" position, toward the "soften" position. The valve passes through but does not stop in the "brine" and "rinse" positions due to operation of relay J, the closing of which electrically connects contacts 128, 129, 131 of the circuit breaker (wires 321, 326, 151) so that they become in effect a continuous segment. Thus when relay J is operated by the closing of contact 303 on the timer, the control valve is caused to move from the "wash" position through the "brine" and "rinse" positions, to the "soften" position, where it stops when brush 122 leaves contact 131 on the circuit breaker.

During the backwashing of the softener, the meter switch is reset as before.

When the control valve returns to the "soften" position the timer is reset to the position at which the follower spring of the cycle stop cam A rests in notch m. The resetting is accomplished by the energizing of timer motor 305 through its own cycle stop contact 300 from strip 309 of the circuit breaker.

In the event that it is desired to omit the additional washing at any time, the meter switch may be set to close its contact at the end of the softening run only and not also in the middle of the softening run. It is then necessary to block out notch n in cam A which may be accomplished by means of an attachment to the side of the cam. The timing of the wash and rinse periods will then be determined by adjustment of cams B and C. The brining period is determined by adjustment of the float switch 37. At the end of the regeneration, after the control valve has returned to the "soften" position, the timer is reset to the point at which the follower spring of cam A drops into notch m, as notch n has been blocked out. It will then be in the required position for cams B and C to again time the wash and rinse on the next regeneration.

The foregoing system may be extended if desired to provide more than one backwashing between regenerations by providing additional notches on the timer cams and setting the meter switch to make the additional contacts between regenerations required for initiating the additional washings, the brining and rinsing steps being eliminated by action of relay J, as described.

*Modified control means providing omission of backwash on alternate regenerations or extra backwash between regenerations*

Figure 3 shows a modified elimination means by which it is possible to omit or shorten the backwashing operation on every other regeneration. This method involves modification of the circuit breaker switch and requires separate timers for the different programs.

Since two different programs are required, the circuit breaker shaft is geared to the control valve shaft through gears 337 and 338 providing a 2:1 reduction. Thus the circuit breaker shaft turns 180 degrees for each revolution of the control valve. The same number and arrangement of contact strips are used on each half of the circuit breaker 208 as are required on the full circumference of the circuit breaker 108 of Figs. 1 and 2. By thus providing two sets of contacts, one for each of two regenerating cycles, it is possible to operate one timer on every other regeneration cycle and to operate another timer adjusted for different wash periods on the intervening cycles. The relays R and L operate the resetting motor 114 on the meter switch when either of the two timers is in operation. They may be eliminated, if desired, by providing separate contacts on the circuit breaker switch for the purpose of energizing the resetting motor. Either or both of the two time switches may be adjusted for a short or zero wash period.

The operation of this elimination control arrangement shown in Fig. 3 is as follows:

When the softener has delivered the quantity of water that it is capable of softening between regenerations, meter switch contact 121 closes as before. This establishes a circuit causing the control valve to turn to the "wash" position, where it stops when the circuit to the coil of the magnetic switch is broken as brush 122 on the circuit breaker leaves contact strip 126A, coming to rest on strips 127A and 128A.

In the "wash" position, the motor 339 of No. 1 timer is energized through wires 354 and 362 from contact strip 127A on the circuit breaker. The timer operates until contact 341 is closed by cam B1, causing the control valve to turn to the "brine" position where it stops when the circuit through wire 356, switch 341 and wire 358 to the coil 102 of the magnetic switch is broken as brush 122 of the circuit breaker passes from strip 128A to strip 129A.

The brining operation takes place as previously described, terminating when the float switch closes, causing the control valve to turn to the "rinse" position. It stops in the "rinse" position when the circuit to the coil 102 of the magnetic switch is broken as brush 122 leaves strip 129A on the circuit breaker and remains in contact with strips 130A and 131A.

In the "rinse" position timer No. 1 is again operated, this time from contact 130A on the circuit breaker through wire 354. It continues to operate until the desired time for rinsing has elapsed as controlled by the setting of cam C1. Contact 342 is then closed by cam C1 of the timer, causing the valve to move to the "soften" position, where it stops when brush 122 leaves strip 131A of the circuit breaker and passes to strip 330.

While the No. 1 timer motor 339 is energized from contact strips 127A and 130A of the circuit breaker during the washing and rinsing of the softener, the coil of relay R is also energized from the same strips through wires 355 and 359. Contacts of this relay are closed thereby, energizing the resetting motor 114 of meter switch 107 through wires 350 and 351. This switch is then reset as before described.

When the softener has again delivered the quantity of water which it can soften between regenerations, meter switch contact 121 again closes. At this time brush 122 is resting on strip 330 of the circuit breaker. The control valve then turns to the "wash" position as before, stopping when the circuit to the coil of the magnetic switch is broken as brush 122 passes from strip 330 to strip 332. If cam B2 of timer No. 2 is set for zero wash, however, the valve continues to move, passing through the wash position, a circuit being established through strip 332, wire 381 and contact 345 to close the magnetic switch 36 which energizes motor 60 to turn the control valve means to "brine" position.

The brining of the softener takes place as described previously, terminating when the float switch closes. At this time the valve is moved to the "rinse" position where it stops when the circuit to the coil of the magnetic switch is broken as brush 122 leaves contact strip 333.

In this "rinse" position of the control valve, motor 343 of timer No. 2 is again energized, this time from strip 334 of the circuit breaker through wire 371. When the desired time interval for rinsing the softener has elapsed, contact 346 is closed by cam C2, causing the control valve to move to the "soften" position, where it stops when the circuit to the coil of the magnetic switch is broken as brush 122 leaves contact 335 on the circuit breaker.

During the alternate "wash" and "rinse" periods determined by No. 2 timer, relay L is closed as its coil is energized from contacts 331 and 334 on the circuit breaker through wires 371, 373 and 374. This relay operates the resetting motor 114 of the meter switch, the current passing through wires 349 and 372, the relay contacts and switch 120.

When the control valve returns to the "soften" position, the timer previously in operation is reset to the starting position. This is accomplished for timer No. 1 by the energizing of the motor 339 from contact 309A on the circuit breaker through wire 360 and the cycle stop contact 340 on the timer closed by cam A1. The motor is thus operated until contact 340 breaks when the contact spring drops into the notch in cam A1. Timer No. 2 is reset in a similar manner, with the motor 343 energized from strip 336 on the circuit breaker through wire 353 and the cycle stop contact 344.

The above described system may be extended if desired to provide short or zero wash periods on one of three regenerations by providing three sets of contacts on the circuit breaker, a ratio of 3:1 for gears 337 and 338, and three individual timers. It may be extended in similar manner for any desired program of regenerations.

A similar control may be used for a system providing additional washing between regenerations, using two or more timers and two or more sets of contacts on the circuit breaker. In addition it would be advantageous to include the modified brine control means shown in Fig. 2.

The above described backwash control system is useful not only in connection with water softeners operated by single multiway valves. It is also useful in controlling plural cam-actuated valves arranged for operation by a common cam shaft. The system is likewise useful with central pilot valve control of plural valves in effecting variable backwash control in an automatic manner.

An outstanding advantage of the invention is the adjustment of the frequency and duration of backwashing in automatic water softening to meet local conditions of water supply.

What we claim is:

1. An electrical control system for a downflow base exchange water softener providing automatic variation and control of the frequency and duration of backwashing, said system comprising an electric motor, valve means having an operating shaft rotated by the motor to make valve connections establishing complete regenerating cycles which include the steps of backwashing, brining and rinsing and for softening in angular positions of the valve operating shaft, circuit breaking switch means comprising a plurality of contact elements and a member operatively connected to the valve operating shaft to contact said elements when the shaft is rotated to said several angular positions, a starting switch for the motor, electromagnetic means connected to said starting switch, timing switch means comprising a plurality of timing switches electrically connected with certain of said contact elements, timing motor means and actuators operated by the timing motor means to close said timing switches at predetermined intervals of time in the operation of the timing motor means to provide in sequence steps of a complete regenerating cycle, a circuit to the timing motor means and means for closing and opening said circuit, electric circuits including the electromagnetic means, certain of the contact elements of the circuit breaking switch means and certain of the timing switches of the timing switch means, the timing switch means being adapted to close said circuits to the electromagnetic means upon operation of said actuators and the circuit breaking switch means being adapted to open said circuits to the electromagnetic means when said member moves so as not to contact said contact elements, and means comprising one of the actuators in the timing switch means adapted to close a predetermined one of said timing switches to obtain a shorter duration of one of said predetermined intervals of time in a regenerating cycle following a complete regenerating cycle.

2. A control system according to claim 1 wherein the last mentioned timing switch is connected in a circuit which includes the electromagnetic means and a contact element of the circuit breaking switch means which has been contacted by the member connected to the operating shaft when said operating shaft has assumed a position wherein the valve means make connections for backwashing, and said last mentioned actuator has been operated by the timing motor means to close said last mentioned timing switch at substantially the time the operating shaft has been moved to said backwashing position by the electric motor.

3. A control system according to claim 1 including additional switch means, a relay for operating said switch means, a circuit including the relay and the last mentioned timing switch, and other circuits connecting said additional switch means to the contact elements of the circuit breaking switch which are contacted by the member connected to the operating shaft when the operating shaft is in position wherein the valve means make connections for backwashing, brining and rinsing.

4. In an automatically operated and controlled regenerative water softener having valve means, electrical operating means adapted to set the valve means periodically for positions of a normal reconditioning cycle which includes the steps of backwashing, regenerating and rinsing and for a softening step, circuit breaking switch means including a plurality of circuit breaking switches and a member operatively connected with the valve means adapted to close a predetermined one of said circuit breaking switches when the valve means has been positioned for each one of said steps and to open said one circuit breaking switch when the valve means has been moved out of said position, timing means including timing motor means and a plurality of timing switches adapted to be opened and closed, a circuit to the timing motor means, means for opening and closing said circuit to the timing motor means, other electrical circuits each including said electrical operating means, one of said circuit breaking switches and one of said timing switches, an actuator in the timing switch means operated by the timing motor means at a predetermined time in the operation thereof to close one of said timing switches to establish one of said circuits at a substantial time interval after the circuit breaking switch in said circuit has been closed by said member in a predetermined step in one cycle, and another actuator in the timing switch means operated by the timing motor means adapted to close one of said timing switches in a circuit which includes one of said circuit breaking switches, substantially simultaneously with the closing of said circuit breaking switch by said member in a predetermined step in another cycle following said one cycle.

5. In an electrically operated and automatically controlled regenerative base exchange water softener having valve control means, an electric motor for said valve control means, starting switch means for said motor, a circuit breaker operated by said motor, and a timing motor, automatic backwash control comprising a plurality of cam-actuated switches operated by said timing motor and wired in circuit with said circuit breaker and said starting switch means energizing and deenergizing said valve motor, certain of said cam actuated switches being arranged to control the valve motor to establish complete regenerating cycles including normal steps of backwashing, brining, and rinsing and others of said cam-actuated switches being arranged to control the valve motor to establish succeeding incomplete cycles in which predetermined individual normal steps are eliminated.

6. Automatic backwash control according to claim 5, wherein the normal backwashing step is eliminated in the succeeding cycles by the closing of one of the cam-actuated switches, thereby shortening the duration of the backwash in alternating regeneration cycles.

7. Automatic backwash control according to claim 5, wherein the normal brining and rinsing steps are eliminated in the succeeding cycles by the closing of one of the cam-actuated switches, thereby providing additional backwashing between complete regeneration cycles.

8. In an automatic electrically controlled water softener having valve means, an electric motor for positioning the valve means, a starting switch for energizing the motor, electrical means for actuating the starting switch, a circuit breaker operated by said motor and timing switch means controlling the starting switch to determine the duration of backwashing in regeneration of the softener, automatic means providing variable backwash control comprising a timing motor in said timing switch means, a shaft rotated by the timing motor, a plurality of cams in different angular positions on the shaft, and follower contacts actuated by the cams to complete different circuits through said electrical means after varying periods of operation of the timing motor to establish varying periods of backwashing corresponding to the respective positions of said cams on said shaft.

9. In an automatic electrically controlled water softener having valve means with operative control by an electric motor, starting switch means for the motor, electrical means for operating said starting switch means, a control circuit for said electrical means, a circuit breaker in said circuit operated by the motor, timing switch means also in said circuit for controlling the duration of backwashing and of rinsing in regeneration of the softener and other means for termination of brining prior to rinsing, automatic means providing additional backwashing between regenerations comprising a timing motor in said timing switch means, a shaft rotated thereby, a cam on the shaft with a follower contact actuated thereby completing said starting switch control circuit to determine the duration of rinsing, a plurality of cams on the shaft with follower contacts closing said starting switch control circuit to terminate backwashing and relay means completing said control circuit to eliminate brining and rinsing steps in regeneration.

10. In a fully automatic downflow regenerative base exchange water softener having valve means adapted to be positioned successively for cycles of softening, backwashing, brining and rinsing, and electrical means for positioning the valve means, a meter switch adapted to energize the electrical means to position the valve means from softening to backwashing, timing switch means adapted to energize the electrical means after a predetermined interval of time to position the valve means from backwashing to brining, a float switch adapted to energize the electrical means to position the valve means from brining to rinsing, a contact in said timing switch means adapted to energize the electrical means to position the valve means from rinsing to softening, and additional means in said timing switch means adapted to energize the electrical means in a predetermined proportion of cycles to position the valve means from backwashing to brining immediately after the valve means have been positioned for backwashing thereby eliminating backwashing in said predetermined proportion of cycles.

11. In a regenerative zeolite softener having a rotary multiport valve adapted to be turned successively to positions for the several operations of softening, backwashing, brining and rinsing in cycles of operation, an electric motor for turning the valve, and a circuit breaker moved by the motor and arranged to deenergize the motor after it has turned the valve to any of the several positions, an improved system providing backwash variation under automatic control which comprises a meter switch starting the motor to turn the valve from softening position to backwashing position, a time switch arranged to close after the valve has remained in backwashing position for a predetermined interval of time and thereby start the motor to turn the valve from backwashing position to brining position, and additional switch means in said time switch short circuiting the circuit breaker in the backwashing position in alternating cycles causing the motor to turn the valve from the softening position to the brining position without stopping in the backwashing position.

NORMAN E. BRICE.
CHARLES M. GULDNER.